March 5, 1968  C. A. BUDDE  3,371,661
SPHYGMOMANOMETER
Filed Feb. 24, 1965
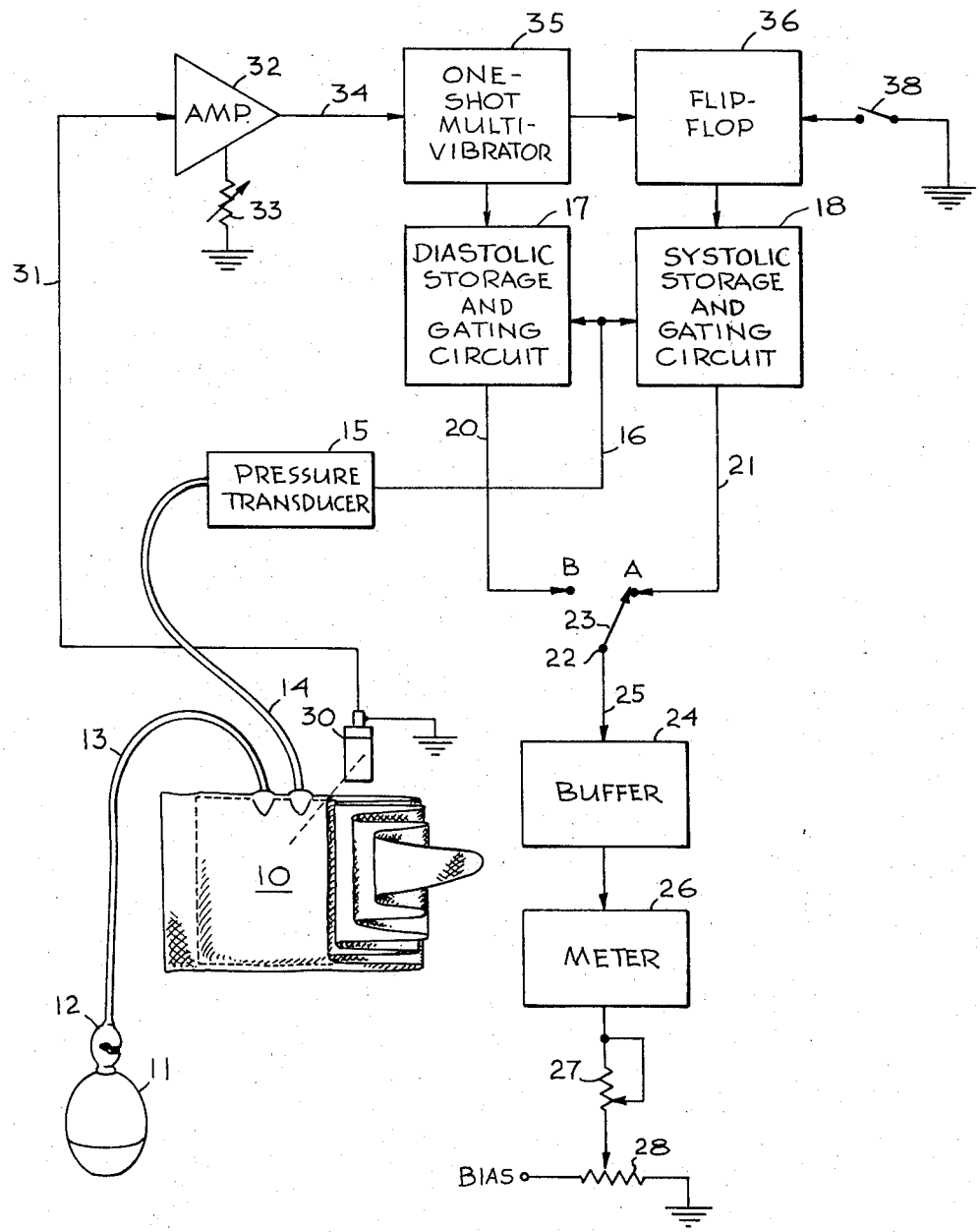
INVENTOR
CARL A. BUDDE
BY
Roger A. Marrs
AGENT

United States Patent Office 3,371,661
Patented Mar. 5, 1968

3,371,661
SPHYGMOMANOMETER
Carl A. Budde, 1303 Grandview,
Glendale, Calif. 91201
Filed Feb. 24, 1965, Ser. No. 434,798
8 Claims. (Cl. 128—2.05)

ABSTRACT OF THE DISCLOSURE

Apparatus is disclosed herein for sensing and measuring fluid pulses under pressure in a duct including a transducer for generating an electrical analog signal which is proportionate to the pressure in the duct and a storage means coupled to the transducer for receiving and holding the analog signal. Electrical means are provided for developing a control signal in response to each fluid pulse and being operatively coupled to the storage means to selectively release the analog signal in response to the control signal.

---

This invention relates to improved pressure sensing instrumentation and more particularly to a novel sphygmomanometer for providing a relatively simple and accurate means of measuring systolic (maximum) and diastolic (minimum) blood pressure.

Conventional sphygmomanometers are used in the clinical measurement of blood pressure. When external pressure is applied to an artery, the systolic blood pressure is registered when the arterial tones become distinctly and regularly audible to the observer listening to the brachial artery via a stethoscope. The diastolic pressure is registered when the sound becomes suddenly dull and muffled after following a procedure of step reducing the applied pressure to the artery.

Difficulties have been encountered when using conventional sphygmomanometers which stem largely from the fact that variations in the audible threshold among individuals will create discontinuities in readings from person to person. These disagreements may vary between 4 to 16 mm. Hg for systolic pressure and 2 to 4.5 mm. Hg for diastolic pressure. Consequently, readings derived from conventional instruments are inaccurate and biased inasmuch as results are usually recorded in 5 mm. Hg steps. Terminal digit preference errors are also encountered as well as prejudice in behalf of the user, for or against certain pressure values. Perhaps the most glaring drawback is that the conventional instrument is dependent upon the audibility threshold of the observer.

The improved sphygmomanometer of the present invention eliminates systematic and audibility threshold sensitivity errors, while greatly reducing the prejudice for or against certain pressure values. This is achieved by providing for a discrete presentation of proportional pressure values and by increasing the display time of systolic and diastolic pressures, thereby allowing the observer a greater opportunity to make proper discrete readings.

Accordingly, the device of the present invention provides means for generating a voltage level which is proportional to the blood pressure immediately after a temporary build up of blood pressure has been effected and for storing the voltage level until released to a display device by the sensing of a radial or popliteal pulse of predetermined amplitude. The released voltage level is indicative of the systolic pressure. Subsequent sensing of pulses will occur with reduced amplitude until the last voltage level being held prior to decline below the predetermined amplitude may be switched to the display device and the resultant reading will be indicative of the diastolic pressure.

Therefore, it is a primary object of the present invention to provide a novel blood pressure instrument which is not dependent upon the hearing ability of an operator.

It is another object of the present invention to provide a novel pressure instrument which is responsive only to those blood pressure pulse amplitude or intensity levels which are representative of the Korotkoff sounds so that the sensing instrument is less susceptible to false triggering.

It is a further object of the present invention to provide a novel pressure sensing instrument which affords the operator a greater opportunity to more accurately interpret the readings sensed by permitting the storage of pressure related voltages for subsequent display, in terms of mm. Hg for long periods of time.

Still a further object of the present invention is to provide a novel pressure sensing instrument which has increased accuray through the use of duplication of readings regardless of the physical condition of the operator such as hearing or digit sensing ability.

It is a further object of the present invention to provide an improved blood pressure sensing and display apparatus which converts systolic and diastolic blood pressure to proportional voltage levels and which stores these levels until released through electronic gating means by occurrence of detected blood pressure pulses.

The features and objects of the present invention which are believed to be novel are set forth with particularity in the appended claims. The present invention, both as to its organization and manner of operation, together with further objects and advantages thereof, may best be understood by reference to the following description taken in connection with the accompanying drawing.

In the drawing, a block diagram is shown illustrating the circuit logic of the novel sphygmomanometer in accordance with the present invention.

A conventional inflatable compression fabric band or cuff 10 is diagrammatically illustrated which is adapted to be wrapped or applied about a limb having an artery for the testing of blood pressure therethrough. The cuff is attached to a bulb or bladder 11 having a release valve 12 by means of a hose 13. The bladder is of conventional type so that it may be actuated by hand, or other means, to inflate the cuff and the opening of the valve 12 may be employed for progressively deflating the compression cuff.

Communicating, via a hose 14, with the cuff 10, there is provided a suitable pressure transducer 15 for generating a voltage level which is proportional to the pressure generated in the cuff 10 during the taking of a person's blood pressure. The voltage level generated by the pressure transducer is applied via line 16 in parallel to a pair of storage and gating circuits represented by the numerals 17 and 18 respectively. The storage and gating circuits may be of conventional diode networks, field effect transistor switches, etc., having output lines 20 and 21 respectively terminating in switch contact point A and B of a selector switch 22. A switch arm 23 of the selector switch is shown in position A which is the proper switch position for reading systolic blood pressure. Switch position B is employed for reading diastolic pressure. The gating circuit 18 is normally conditioned in a closed state to that the voltage level developed by the pressure transducer may initially be passed through the circuit 18 and the switch 22 to a buffer 24 via a line 25 and then from the buffer unit to a suitable display device, such as, for example, a conventional meter 26. The buffer is employed for separating the display device from the gating circuits, particularly when the display device has a low impedance such as a conventional meter for example.

Preferably, the display device will indicate the systolic and diastolic pressures on a scale measurement of pressure of the equivalent of two millimeters of mercury (mm. Hg). The buffer unit has an extremely high input impedance to prevent the rapid decay of the DC voltage level representing systolic and diastolic blood pressures. In the present instance, it may be said to have a low output impedance, in order to drive the meter. A potentiometer 27 is used to calibrate the meter for an accurate full scale reading while another potentiometer 28 is used to zero or null the meter against any offset voltages which may inadvertently be present in the circuit.

The operation of the gating circuits 17 and 18 is under the control of a keying circuit, which comprises a suitable pickup device 30 such as a microphone, which is capable of detecting the Korotkoff sounds and for passing electronic control signal pulses in accordance with the detected sound via line 31 to an amplifier 32. Preferably, the microphone is secured in or to the cuff so that application of the cuff about the arm or other limb places the microphone in proper orientation for detecting the sounds. The amplifier serves not only to increase the amplitude of the pulse signal, but to shape the signal generated by the pickup device to a level suitable for usage with the remainder of the circuitry. A potentiometer 33 is used to adjust the gain of the amplifier so that a particular threshold will occur at the same level from one instrument to another. Preferably, the amplifier has a frequency response which is flat from 20 cycles per second to 200 cycles per second.

The output from the amplifier 32 is applied via line 34 to a one shot multivibrator circuit 35 which has a specific predetermined threshold which when reached by the amplitude of the control signal input pulse from the amplifier will cause the one shot multivibrator to be triggered. The output of a multivibrator is connected in parallel to a conventional flip-flop circuit 36 and to gating circuit 17. The monostable multivibrator is used to actuate the storage and gating circuit 17 and to reset the systolic flip-flop 36. The flip-flop in turn, is used to open and close the systolic storage and gating circuit 18.

In actual operation, the deflated compression cuff 10 is applied evenly and snugly, but without constriction, about the upper right arm of a person whose blood pressure it is desired to determine. The compression cuff is inflated by actuation of the bladder 11 to a reading on the meter 26 of 200 mm. Hg. Such a reading will take place inasmuch as the pressure generated in the cuff will actuate the pressure transducer 15 to provide a voltage in proportion to the cuff pressure which is directly related to the build up pressure in the artery. Inasmuch as the storage and gating circuit 18 is normally closed, by virtue of the set position of the flip-flop 36, the voltage level will be passed via the selector switch 22 and the buffer 24 to the meter 26.

Next, a switch 38 is depressed momentarily to cause the resetting of the flip-flop 36 and thereby to open the storage and gating circuit 18 which has the effect of storing or holding the voltage level provided by the pressure transducer. The cuff is then deflated at a rate of 2 to 4 mm. Hg per second by opening the valve 12 to bleed the cuff system.

As the cuff is deflated, radial or popliteal pulses will return to the artery. When the pulse in the radial artery system returns, it will be detected by the microphone 30 carried by the cuff, converted to electrical control signal pulses which are amplified and shaped by the amplifier 32. If the amplitude of the pulse signal is above a specific predetermined threshold, the one shot multivibrator 35 will be triggered. A triggering of the one shot multivibrator will set the flip-flop 36 to close the storage and gating circuit 18. The DC voltage level, from the pressure transducer 15, which is proportional to the pressure at the moment, is now released from the storage and gating means 18 and applied to the meter 26, since switch 12 is in position A and is equal to the systolic blood pressure.

As the pressure begins to drop in the artery due to the release of the inflated system by valve 12, the arterial pulse which generates the Korotkoff sounds will become less and less intense causing the amplitude of the output control signal from the amplifier to become progressively reduced until, at the point of the diastolic pressure, the amplitude of the signals will drop below the threshold level established by the multivibrator circuit 35. However, as long as the signals are above the threshold level, each time the multivibrator 35 is triggered by the amplified control signals, storage and gating circuit 17 is open and the D.C. voltage level from the pressure transducer is stored. Therefore, the last voltage level stored by the storage and gating circuit 17 before the Korotkoff sounds fall below threshold, is proportional to the diastolic blood pressure. After the systolic pressure has been recorded, selector switch 22 is thrown to position B at which time the indicating needle on the meter 26 will drop to a new reading which is indicative of the diastolic blood pressure.

Therefore, it can be seen that the device and apparatus of the present invention are not dependent upon the hearing ability of an individual operator and that the device is responsive only to those frequencies and pulse amplitudes or intensities which are representative of the Korotkoff sounds making the detecting and displaying systems less susceptible to false triggering. Furthermore, the storage of the pressure related voltage and subsequent display, in term of mm. Hg, for a long period of time, affords the operator a greater opportunity to more accurately interpret the readings presented to him. The device affords the simplicity of circuitry, ease of operation and convenience of portability.

The apparatus of the present invention is susceptible of modification such that the use of the meter 26 only as a null indicator and, by using a potentiometer with a digital readout device in place of the adjusting potentiometer 16, it would be advantageous to read the blood pressure in mm. Hg directly from the digital readout on the potentiometer. This would result in another degree of improvement, since no interpretation would be necessary as when reading the meter directly. Furthermore, the system of the present invention may be modified so as to apply the D.C. voltage output from the buffer to an analog to decimal converter for automatic electronic presentation of the systolic and diastolic pressure readings. By adding another buffer and using one such buffer in conjunction with the storage and gating circuit 17 and the other in conjunction with the storage and gating circuit 18, it would be possible to automatically display both systolic and diastolic blood pressure simultaneously.

Although the foregoing description relates to sphygmomanometers for measuring blood pressure in an artery, it is to be noted that the present invention relates to the measurement of pressure in any fluid pulsing system incorporating ducts, conduits or passages in the same manner as arteries in the human body.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. An apparatus for measuring pressure in a pulsating duct comprising:
   means for generating a voltage level which is proportionate to the pressure in the duct;
   means connected to said generating means for storing said voltage level;
   means coupled to said storage means for displaying said voltage level;
   means for producing a control signal responsive to the intensity of each pulse of the pulsating duct; and
   keying means coupling said control signal producing means to said storage means for selectively supplying said voltage level to said displaying means in response to said control signal.

2. The invention as defined in claim 1 wherein said storage means including a first storage means representative of a systolic pressure value and a second storage means representative of a diastolic pressure value:

said first and said second storage means being connected in parallel to said generating means; and
a switch alternatively coupling said first and said second storage means to said display means.

3. An apparatus for measuring pressure in a pulsating duct comprising:

a transducer for generating a voltage level which is proportionate to the pressure in the duct;
electronic means connected to said transducer for storing said voltage level;
means for displaying said voltage level in digital format;
electronic circuit means for producing an electrical control signal responsive to the intensity of each pulse of the pulsating duct; and
electronic keying means coupled to said control signal means and said storage means for supplying said voltage level to said displaying means in response to said control signal when said control signal is within a predetermined amplitude range.

4. Apparatus for measuring pulsating fluid in a duct comprising:

an inflatable compression cuff disposed about the duct;
means for inflating said cuff;
a pressure transducer connected to said cuff generating a voltage level proportional to the pressure of said cuff;
means connected to said transducer for storing said voltage level;
display means connected to said storing means for exhibiting said voltage level in digital format;
a pickup device operable in response to the fluid pressure pulses in the duct to produce a control signal; and
a keying control circuit operatively coupled to said pickup device and said storage means for releasing said voltage level from said storage means in response to said control signal.

5. Apparatus for measuring pulsating fluid in a duct comprising:

an inflatable compression cuff disposed about the duct;
means for inflating said cuff to restrict the flow of fluid pulses;
a pressure transducer connected to said cuff for generating a voltage level proportional to the pressure of the restricted duct;
electronic means connected to said transducer for storing said voltage level;
display means connected to said storing means for exhibiting said voltage level in digital format;
valve means for progressively deflating said cuff to permit the flow of the fluid pulses in the duct;
a pickup device operative in response to the fluid pulses to produce an electrical control signal; and
a keying control circuit operatively coupled to said pickup device for affecting the release of said voltage level from said storage means to said display means in response to said control signal.

6. A sphygmomanometer for measuring systolic and diastolic blood pressure in an artery comprising:

an inflatable compression band disposed about the artery;
a bulb for inflating said band to restrict the flow of pulsating blood through the artery;
a pressure transducer coupled to said band adapted to generate an electrical voltage level which is proportional to the blood pressure in the artery;
a systolic storage and gating circuit;
a diastolic storage and gating circuit;
said systolic and said diastolic storage and gating circuits connected in parallel to said pressure transducer;
a display meter having a scale calibrated in mm. Hg;
a manually operated switch for alternately connecting said systolic and said diastolic storage and gating means to said display meter;
a valve carried on said bulb for progressively deflating said compression band to permit the return of blood pulsations in the artery;
a microphone for developing a control signal responsive to each blood pulse in the artery;
an amplifier coupled to said microphone for amplifying and shaping said control signal;
a flip-flop circuit coupled to said systolic storage and gating circuit adapted to release said voltage level stored therein;
a one shot multivibrator adapted to be triggered by said control signal and having a first output coupled to said diastolic storage and gating circuit for releasing said voltage level stored therein and a second output coupled to said flip-flop circuit for effecting the setting thereof; and
a manual switch connected to said flip-flop circuit to re-set said flip-flop circuit.

7. The invention as defined in claim 6 wherein said microphone is carried by said band so that application of said band about the artery orients said microphone in a position to detect Korotkoff sounds.

8. Apparatus for sensing and measuring fluid pulses under pressure in a duct comprising:

means for restricting the duct to develop an increased pressure in the duct to prevent the flow of the fluid pulses;
a transducer for generating an electrical analog signal which is proportionate to the pressure in the duct;
storage means coupled to said transducer for receiving and holding said analog signal;
means for progressively releasing said increased pressure in the duct to permit the flow of the fluid pulses; and
electrical means for developing a control signal in response to each fluid pulse and being operatively coupled to said storage means to selectively release said analog signal in response to the application of said control signal to said storage means and further including circuit means for applying said control signal to said storage means only when the amplitude of said control signal is within a predetermined range.

References Cited

UNITED STATES PATENTS

| | | | |
|---|---|---|---|
| 2,827,040 | 3/1958 | Trilford | 128—2.05 |
| 3,051,165 | 5/1962 | Kompelien | 128—2.05 |
| 3,087,488 | 4/1963 | Streimer | 1128—2.05 |
| 3,117,570 | 1/1964 | Halasz et al. | 128—2.05 |
| 3,192,921 | 7/1965 | Erickson et al. | 128—2.05 |
| 3,308,811 | 3/1967 | Gillette et al. | 128—2.05 |
| 3,319,623 | 5/1967 | London | 128—2.05 |

RICHARD A. GAUDET, *Primary Examiner.*

SIMON BRODER, *Examiner.*